No. 845,568. PATENTED FEB. 26, 1907.
N. C. NIELSEN.
COLORED LIGHT DISPLAY MECHANISM.
APPLICATION FILED FEB. 23, 1906.
3 SHEETS—SHEET 1.
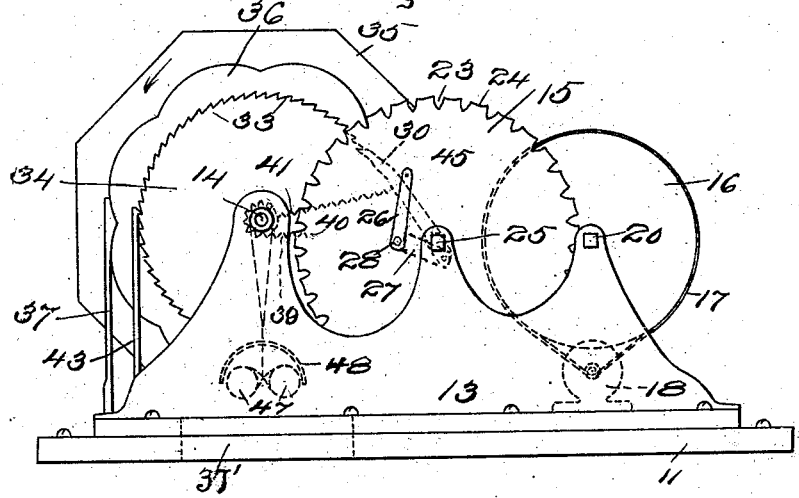
Fig. 1
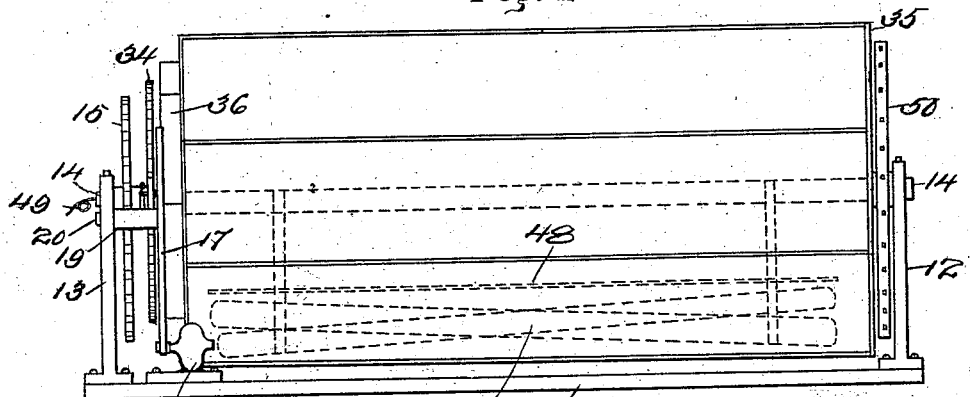
Fig. 2
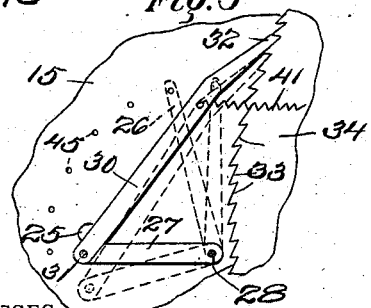
Fig. 3
Fig. 4
WITNESSES:
INVENTOR:
Niels C. Nielsen
BY Mason Fenwick & Lawrence
ATTORNEYS No. 845,568. PATENTED FEB. 26, 1907.
N. C. NIELSEN.
COLORED LIGHT DISPLAY MECHANISM.
APPLICATION FILED FEB. 23, 1906.
3 SHEETS—SHEET 2.
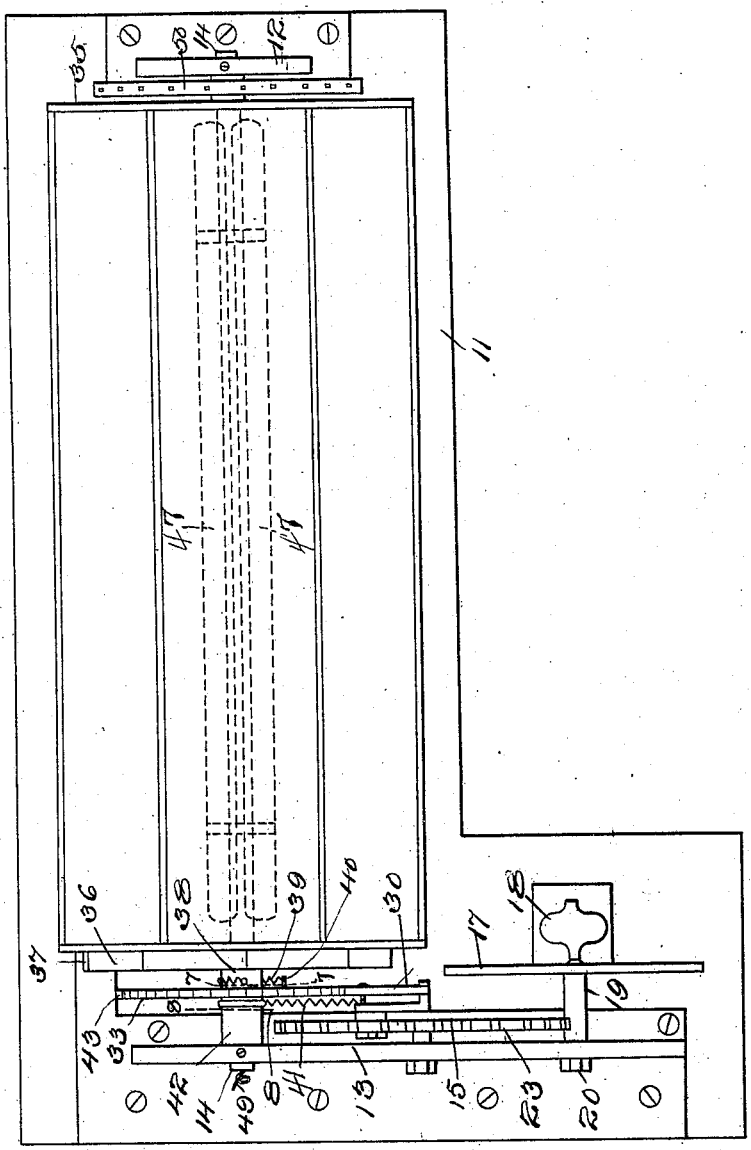
WITNESSES:
INVENTOR.
ATTORNEYS No. 845,568. PATENTED FEB. 26 1907.
N. C. NIELSEN.
COLORED LIGHT DISPLAY MECHANISM.
APPLICATION FILED FEB. 23, 1906.
3 SHEETS—SHEET 3.
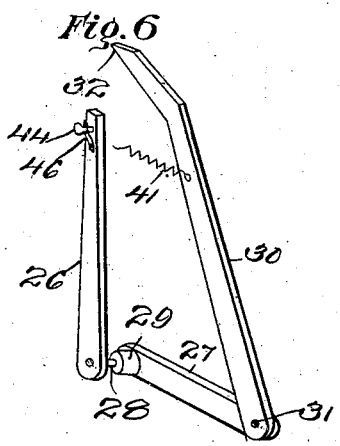
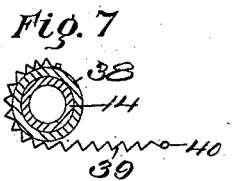
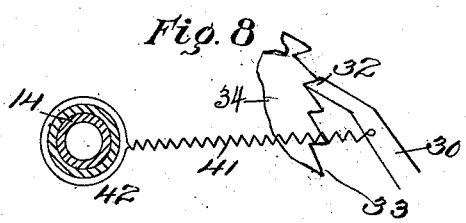
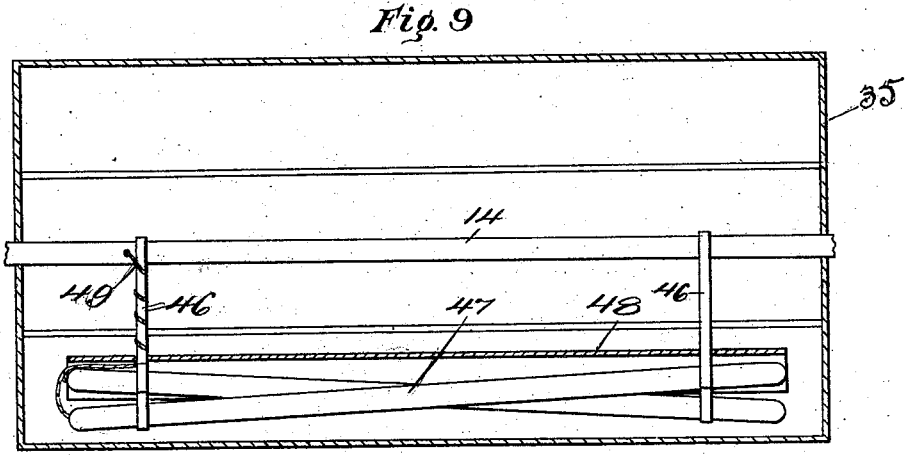
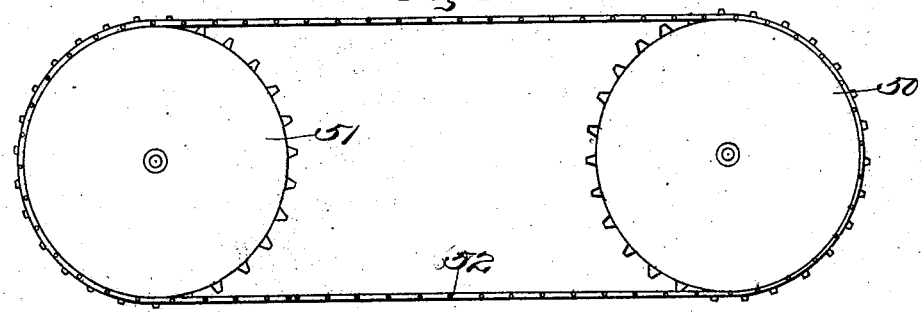
WITNESSES:
INVENTOR.
ATTORNEYS

UNITED STATES PATENT OFFICE.

NIELS C. NIELSEN, OF DENVER, COLORADO.

COLORED-LIGHT-DISPLAY MECHANISM.

No. 845,568.  Specification of Letters Patent.  Patented Feb. 26, 1907.

Application filed February 23, 1906. Serial No. 302,569.

*To all whom it may concern:*

Be it known that I, NIELS C. NIELSEN, a citizen of Denmark, residing at Denver, in the county of Denver and State of Colorado, have invented certain new and useful Improvements in Colored-Light-Display Mechanism; and I do hereby declare the following to be a full, clear, and exact description of the invention, such as will enable others skilled in the art to which it appertains to make and use the same.

This invention relates to devices for displaying colored lights; and it is especially adapted for illuminating show-windows and the like and for changing at predetermined and regular intervals the color of the light displayed.

A further object of the invention is to provide a device of the class described involving an illuminated drum mounted to be rotated by a motor and to receive from the motor actuating means for moving the said drum at intervals only, and such movement to be accomplished practically instantaneously.

A further object of the invention is to provide a device of the class described arranged for operation by an electric motor of any usual and ordinary design and embodying improved means for reducing the high rate of speed of the motor to the necessary and desired rate of rotation to the drum.

With these and other objects in view the invention comprises certain novel constructions, combinations, and arrangements of parts, as will be hereinafter fully described and claimed.

In the drawings, Figure 1 is a view in end elevation of the improved display device. Fig. 2 is a view of the display device in side elevation. Fig. 3 is an enlarged detail elevation of the variable eccentric pawl for operating the drum-actuating device. Fig. 4 is a detail elevation of a part of the train from the motor to the drum. Fig. 5 is a top plan view of the display device. Fig. 6 is a detail perspective view of the eccentric pawl shown in elevation in Fig. 3. Fig. 7 is a transverse sectional view of the axle and associated parts taken on line 7 7 of Fig. 5. Fig. 8 is a transverse sectional view through the hollow axle and associated parts taken on line 8 8 of Fig. 5. Fig. 9 is a longitudinal vertical sectional view through the drum of the device. Fig. 10 is a view in end elevation of the device associated with a similar drum and operated from the same motor.

Like characters of reference indicate corresponding parts throughout the several views.

In its preferred embodiment the improved display device forming the subject-matter of this application comprises a base 11 of any improved form and size, upon opposite ends of which are erected standards 12 and 13, supporting the hollow axle 14 rigidly thereupon. Upon the standard 13 are also mounted the wheels 15 and 16, the latter driven by means of a belt 17 or equivalent means from the motor 18 of any approved size and construction.

The wheel 16 is carried upon a sleeve 19, journaled upon the pin 20, the said sleeve being provided with notches 21 intermediate its ends, between which notch is disposed a tooth 22, positioned and proportioned to engage spaced notches 23, formed about the periphery of the wheel 15, between which the periphery is concaved, as shown at 24, to fit upon and correspond to the convexity of the sleeve 19.

The wheel 15 is journaled upon and rotates about the pintle 25 as an axis and is provided with arms 26 and 27, disposed at substantially right angles to each other and upon opposite surfaces of the said wheel 15 and rigidly connected by means of a pin 28, extending through the said wheel, and with the arm 27 spaced away from the surface of the said wheel by means of a sleeve 29. Upon its end opposite the pivot 28 the arm 27 carries a pawl 30, pivoted thereto, as at 31, and provided at its end opposite the pivot with a tooth-like end 32, proportioned and positioned to engage the ratchet-teeth 33 of a wheel 34, mounted to rotate freely upon the hollow axle 14.

Upon the axle 14 is also mounted the drum 35, polygonal in form, and with its several sides composed of transparent or translucent media, preferably glass, varying in color upon the said sides. One end of the drum 35 is adjacent the wheel 34 and has rigidly secured to the end thereof a scalloped disk 36, engaged by a spring-detent 37, whereby the said drum is normally positioned with one of its polygonal sides undermost and directly above an opening formed at 37' in the base 1. The drum 35 and its associated scalloped wheel 36 are provided with an axial sleeve 38, extending between the said wheel 36 and the wheel 34, and about which is wound a spiral or coil spring 39, secured, as by a pin 40, to the wheel 34 at any predetermined distance from its center. The pawl 30 is held in engagement with the teeth 33 of the wheel 34 in any approved manner, as by means of a coil-spring 41, secured at one end to the said pawl, and at its opposite end to a sleeve 42, carried rigidly upon the axle 14. The wheel 34 is engaged by a spring-detent 43 to prevent reverse or backward movement, and the position of the pivot 31 of the pawl 30 is regulated by means of an arm 26, moved angularly about its pivot 28 in the wheel 15 and secured at such angular adjustment by means of a detent 44, retained in any approved manner in the spaced holes 45, as by the spring 46.

Within the drum 35 any approved lighting agent is suspended from the axle 14, as by the supports 46, the said lighting agents being here shown diagrammatically as the mercury-vapor tubes commonly known as the "Cooper-Hewitt" light, as at 47, the said lights being beneath a reflector-shade 48, which prevents the escape of light therefrom except downwardly through the polygonal side of the drum 35, which is for a time above the opening 23. The lights are supplied with electric current through any usual and ordinary wiring, as shown at 49, extending through the hollow axle 14, and passing through an opening in the side of said axle are electrically connected with the said vapor-tubes in any approved manner, substantially as shown.

At the end opposite the wheel 36 the drum 35 is preferably provided with a concentric sprocket-wheel 50, which is used to connect the said drum to a similar drum without motive power by means of a similar sprocket-wheel 51, which may be secured to the said drum, and the said drums operated simultaneously through the medium of the sprocket-chain 52.

In operation the wheel 16 is rotated constantly from the motor 18 through the medium of the belt 17, with the sleeve 19 rotating within the concavities 24 of the wheel 15 until the tooth 22 engages within one of the peripheral notches 23 of the said wheel, whereupon the said wheel is rotatably moved the distance of one notch. It will thus be seen that the wheel 15 is rotatably moved but the distance of one notch for each complete revolution of the wheel 16. Upon the wheel 15 is mounted the connected arms 26 and 27 eccentrically of the said wheel, and with the pawl 30 pivoted upon the free end of the arm 27 and with its opposite end engaging the wheel 34. The pivot 31, connecting the pawl 30 and arm 27, is arranged to be adjusted at various distances from the center of the said wheel 15 by a movement of the arm 26 about its pivot 28 and to be held in such adjusted position by the detent 44, engaging within the holes 45. It will be seen that as the wheel 15 rotates, the pivot-pin 31 being eccentric to the said wheel, the pawl 30 is given a single longitudinal reciprocation for each revolution of the said wheel, and with the distance of longitudinal travel of the said pawl is regulated by the distance of its pivot end from the center of its actuating-wheel 15. With the pawl and its associated arms in the position shown in Fig. 1 each revolution of the wheel 15 will move the pawl longitudinally to a distance approximating the interval between the teeth 33 upon the wheel 34. If, however, the arm 26 is moved to the right upon its pivot 28, the pivot 31 of the pawl is moved farther from the center of the wheel 15, and the pawl thereby given a greater longitudinal travel for each revolution of the said wheel. In practice it is found desirable to so space the holes 45 that each controls the movement of the pawl 30 equal to the interval between the teeth 33, whereby the wheel 34 is moved through a greater arc at each revolution of the wheel 15 as the pivot 31 is farther from the center. To the wheel 34 the spring 39 is secured by the eccentric-pin 40, and by the movement of the said wheel 34 the said spring is wound about the sleeve 38 until the tension of the said spring 39 is great enough to overcome the detaining pressure of the detent 37, whereupon the sleeve 38 and its associated drum and wheel 36 are moved in the direction indicated by the arrow until the said detent 37 engages the next notch in the said wheel 36, whereupon the drum 35 is stopped and held with its next polygonal side above the opening 37', and the motion of the said drum is stopped until the wheel 34 has been rotated sufficiently to produce a tension of the spring 39 necessary to again retain the drum. It will thus be seen that the wheel 15 is intermittently rotated from the sleeve 19 by being engaged by the tooth 22, and with each rotation of the wheel 15 moves the pawls 30 and with the pawl 30 moves the wheel 34 through an arc regulated by the distance of its pivot from the center.

By providing the drum 35 with sides of different-colored glasses the color of the light projected through the opening 23 is thereby changed at each movement of the drum 35, and said drum is only moved intermittently when the spring 39 received sufficient tension for such purpose.

What I claim is—

1. In a device of the class described, a drum having translucent sides, a motor arranged for constant rotary movement, means connecting the motor and drum for imparting an intermittent rotary movement to the drum at the end of a predetermined number of revolutions of the motor, and means for varying the relative movement of the motor and drum.

2. In a device of the class described, a drum mounted for rotary movement, means for holding the drum against rotary movement, a resilient member connected with the said drum, and means to increase the tension upon the said resilient member to overcome the retaining means.

3. In a device of the class described, a drum mounted for rotary movement, a resilient detent arranged to hold the said drum against accidental rotary movement, a resilient member connected with the said drum, and positioned to move the said drum rotatably, and means to increase the tension upon the said resilient member to overcome the retaining force exerted by the detent.

4. In a device of the class described, a drum journaled upon a stationary axle, and provided with a concentric rigid sleeve, a resilient detent arranged to hold the said drum against rotary movement, a resilient member wound about the sleeve and arranged to move the drum rotatably, and means to increase the tension upon the resilient member to overcome the retaining force of the detent.

5. In a device of the class described, a drum mounted for rotary movement, a ratchet-wheel associated with and to operate the drum, a pawl in engagement with the said ratchet-wheel and carried eccentrically upon a rotating member, and means to vary the distance of the pawl connection from the center of the rotating member.

6. In a device of the class described, a ratchet-wheel mounted for rotary movement, a rotating member mounted adjacent the ratchet-wheel, a pawl pivoted upon the rotating member, and engaging the ratchet-wheel, and means to vary the pivotal connection of the pawl relative to the center of the rotating member.

7. In a device of the class described, a ratchet-wheel mounted for rotary movement, a rotating member mounted adjacent the ratchet-wheel, an arm pivoted eccentrically upon the rotating member, a pawl pivoted upon the arm, and means to move the arm to vary the pivotal connection of the pawl therewith relative to the center of the rotating member.

8. A device of the class described, comprising a polygonal drum mounted to rotate and having its polygonal sides provided with various colored translucent media, a sleeve carried by said drum and rigid therewith, a ratchet-wheel mounted to rotate and concentric with the said drum, a resilient member carried by the ratchet-wheel and wound about the sleeve, a wheel mounted to rotate adjacent to the ratchet-wheel and provided with spaced peripheral notches, and with the periphery concaved between the said notches, an arm carried by the said notched wheel, a pawl pivoted upon the arm, means to move the arm to vary the pivot of the pawl with relation to the axis of the wheel, a shaft mounted to rotate in the concavities of the notched wheel, a tooth carried by the shaft and arranged to engage successive notches of the wheel, at each revolution, and a motor for rotating the shaft.

In testimony whereof I have affixed my signature in presence of two witnesses.

NIELS C. NIELSEN.

Witnesses:
 CARLE WHITEHEAD,
 WOLF C. HANSEN.